United States Patent [19]
Mefford et al.

[11] Patent Number: 5,964,361
[45] Date of Patent: Oct. 12, 1999

[54] ERGONOMIC STORAGE RACKS

[75] Inventors: Roger W. Mefford, Andover; Daniel W. Clapp, Great Meadow; Byron P. Horn, Hackettstown, all of N.J.

[73] Assignee: Frazier Industrial Company, Long Valley, N.J.

[21] Appl. No.: 08/804,743

[22] Filed: Feb. 21, 1997

[51] Int. Cl.$^6$ .................................................. A47F 1/00
[52] U.S. Cl. ......................... 211/189; 211/191; 414/267; 414/286
[58] Field of Search ................... 211/189, 151, 211/193, 191; 414/267, 286

[56] References Cited

U.S. PATENT DOCUMENTS

| | | | |
|---|---|---|---|
| 2,644,688 | 7/1953 | Roberge | 211/189 X |
| 2,925,920 | 2/1960 | Skubic | 211/192 |
| 3,144,944 | 8/1964 | McConnell | 211/192 X |
| 3,212,648 | 10/1965 | Baker, Jr. et al. | 211/189 X |
| 3,323,655 | 6/1967 | Foran et al. | 211/189 X |
| 3,695,456 | 10/1972 | Lewis | 211/189 X |
| 3,757,967 | 9/1973 | Colbridge | 211/189 X |
| 3,785,502 | 1/1974 | Konstan | 211/151 X |
| 3,871,525 | 3/1975 | Al-Dabbagh et al. | 211/189 X |
| 4,074,812 | 2/1978 | Skubic et al. | 211/192 |
| 4,462,500 | 7/1984 | Konstant et al. | 211/151 |
| 4,613,270 | 9/1986 | Konstant et al. | 211/151 X |
| 4,633,788 | 1/1987 | Robertson | 211/189 X |
| 4,773,546 | 9/1988 | Konstant | 211/151 |
| 4,949,852 | 8/1990 | Allen | 211/151 |
| 4,982,851 | 1/1991 | Konstant | 211/151 |
| 5,011,031 | 4/1991 | Konstant | 211/191 |
| 5,012,938 | 5/1991 | King | 211/191 |
| 5,096,648 | 3/1992 | Johnson et al. | 211/151 X |
| 5,184,738 | 2/1993 | Allen | 211/151 |
| 5,202,818 | 4/1993 | Betsch et al. | 211/189 X |
| 5,310,066 | 5/1994 | Konstant | 211/193 |
| 5,316,157 | 5/1994 | Konstant | 211/151 |
| 5,328,038 | 7/1994 | Allen | 211/151 |
| 5,350,074 | 9/1994 | Rosenband | 211/192 |
| 5,393,188 | 2/1995 | Scott et al. | 211/151 X |
| 5,588,541 | 12/1996 | Goetz | 211/189 X |
| 5,624,045 | 4/1997 | Highsmith et al. | 211/192 |
| 5,655,675 | 8/1997 | Clark et al. | 211/191 X |
| 5,749,481 | 5/1998 | Miller | 211/191 |

*Primary Examiner*—Daniel P. Stodola
*Assistant Examiner*—Khoa Tran
*Attorney, Agent, or Firm*—Joseph W. Molasky & Associates

[57] ABSTRACT

An ergonomic storage rack in which arcuate rails are joined to a horizontal beam in a spaced-apart relationship to form an access area therebetween. The arcuate rails form shelves on which loaded pallets may be stored. The rails may be positioned at any desired height but, preferably, at a level which defines beneath each rail an additional storage area. The access area may be entered by a worker to access whatever pallet load has been stored and select from its sides those items which are to be retrieved.

7 Claims, 4 Drawing Sheets

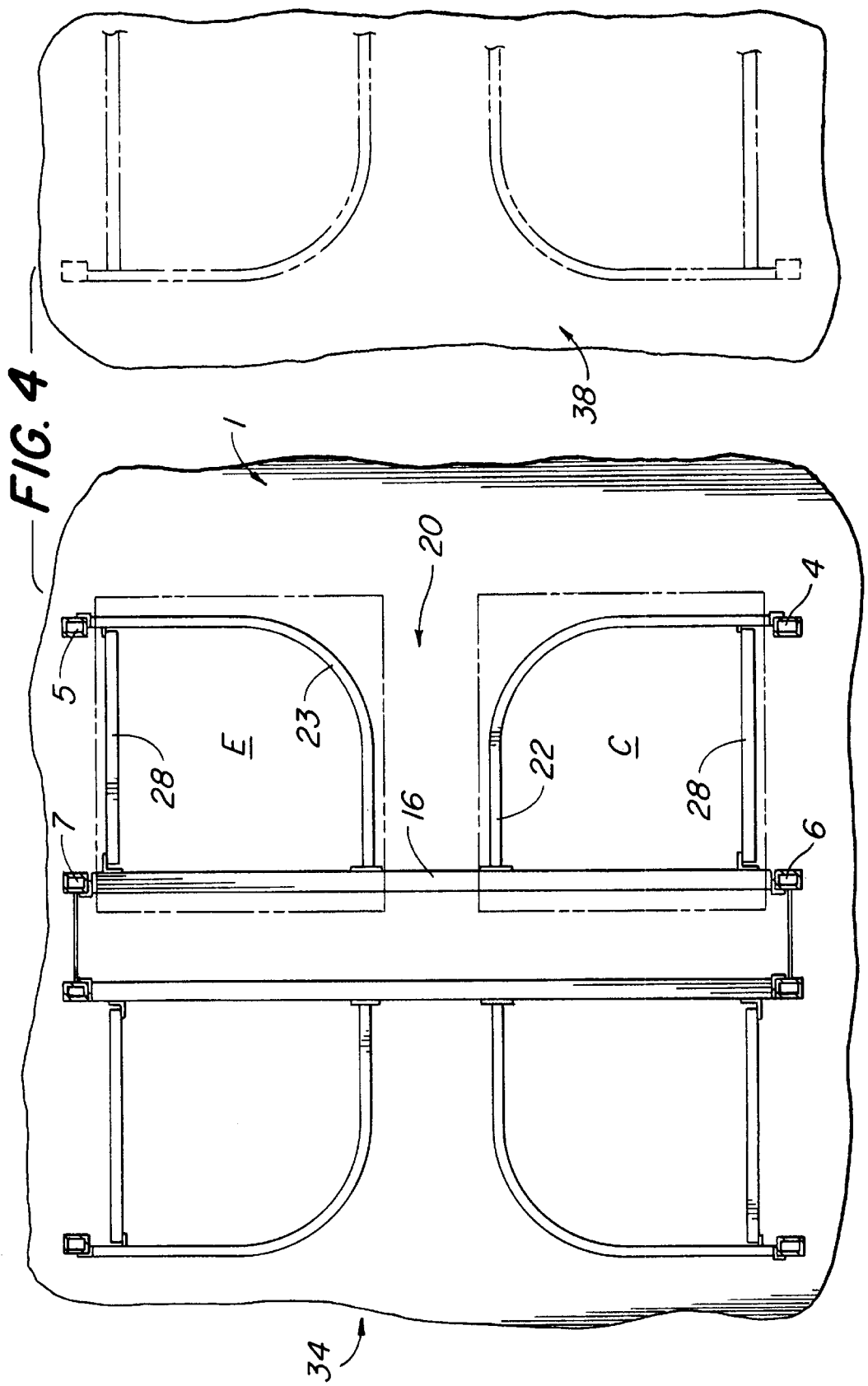

ERGONOMIC STORAGE RACKS

BACKGROUND OF THE INVENTION

1. Field of the Invention

This invention relates to a storage rack assembly for storing loaded pallets and to a storage system which allows the user to select and retrieve items from the front and from the sides of pallets thus stored.

2. Description of the Prior Art

Storage systems which can accommodate four loaded pallets side-by-side are known in the art. Typically, the pallets are either stored on a floor or on a low shelf supported by stanchions anchored to the floor. The remaining pallets are, generally, located above the other two on spaced parallel support beams, again side-by-side, and usually, at chest level so that the user can conveniently pick off the loaded pallets from the front. In this system, storage racks can be joined together horizontally, vertically, and back-to-back to create multiple rack assemblies which, if more than two deep, can be serviced by fork lifts with deep-reach ability. Once the pallet load has been exhausted the empty pallet is removed by hand. If the system includes a mezzanine the two pallet levels above the mezzanine can usually be reached without a lift.

In push-back systems which serve multiple loads, the loaded pallets are put onto rolling carts and, when unloading occurs, the empty pallet can be removed by hand to make room for the next pallet load, which rolls forward automatically on an inclined track. In this system loading and picking is done from the same side. By contrast, in a pallet flow system pallet loading takes place on one side of the racks and picking on the opposite side, with loaded pallets stored between.

All such systems suffer a common problem; their respective bays are as a rule only slightly wider than two pallets and these are supported on horizontal support beams. As a result, picking by hand at any level and particularly on ground or mezzanine level can be accomplished only from the front of a pallet so that it becomes difficult, if not impossible, to pick from the rear at floor level.

SUMMARY OF THE INVENTION

This invention provides improved means for picking stored items from storage rack assemblies which are stored at floor or mezzanine levels, that is, levels which can be reached without a lift.

More particularly, this invention relates to a storage rack system in which two pallets may be stored simultaneously at the same level and which creates therebetween a bay area or an entrance aisle. The bay, when entered, allows the user to retrieve whatever is needed by providing access to the pallets both from the side and the front. This is achieved by securing two arcuate rails to a like number of columns and to a single horizontal beam. The rails are in a spaced apart relationship so as to define an area between the rails which can serve as a work station or bay. This bay, when entered, is of such dimensions as to allow the user to pick from the pallet sides that which is sought to be retrieved.

This system may be installed upon a floor or it may be incorporated into an existing storage rack on a mezzanine level, that is, on a second level or at some higher story of a multi-tiered structure.

Structurally, the assembly of this invention is comprised of four vertically disposed columns arranged in pairs in such manner that the rear column of each pair is interconnected with the rear column of another pair by a horizontal beam which extends therebetween, the object being to maintain the columns some desired distance apart.

Into this framework are secured two opposing spaced apart arcuate rails, the proximate ends and distal ends of which are joined to said beam and to an adjacent front column in each column pair. The arcuate rails, once secured to the beam and columns, form two gently curved shelves at levels which provide therebeneath the storage space for a pallet load.

The joining of the vertical columns to the horizontal beam and to the arcuate rails may be achieved by a variety of means, but, preferably, they are secured by connector plates held in place by nuts and bolts or rivet means and the like. Also included, for additional support, is a horizontal brace which extends generally in a plane from a point near the distal end of each arcuate rail to the horizontal beam. The resulting structure is an eminently strong and rigid assembly capable of receiving multiple pallet loads safely and with ample room for servicing.

Although the racks of this invention have thus far been described in terms of a single unit, it should also be understood that individual units may be joined together back-to-back by horizontally disposed connecting bars which join the rear columns of one unit to the rear columns of another.

It is an object of this invention to provide storage racks which will accept a loaded pallet and allow access to both the side of the pallet, as well as access to the front at heights which do not exceed the user's reach.

A further object is to provide a storage rack system in which pallets are stored on arcuate rails and thus avoid the angularity which is intrinsic to known systems.

A still further object provides for positioning the arcuate rails at a height which defines beneath the rails an area which may serve as an additional storage compartment.

Still another object is to provide a storage rack system which is economical to construct and efficient and cost-effective to operate.

Yet another object is to provide a storage rack assembly which can be added to existing systems so as to make available additional storage space.

This invention will now be described by reference to the drawings and to embodiments which are illustrated in the Figures, where the reference numerals correspond to the like-numbered components in the text.

BRIEF DESCRIPTION OF THE DRAWINGS

FIG. 4 is a sectional view taken along line 4—4 of FIG. 2 and a fragmentary overhead view in phantom of an adjacent storage rack without pallet loading.

DESCRIPTION OF THE PREFERRED EMBODIMENTS

Figure 1:
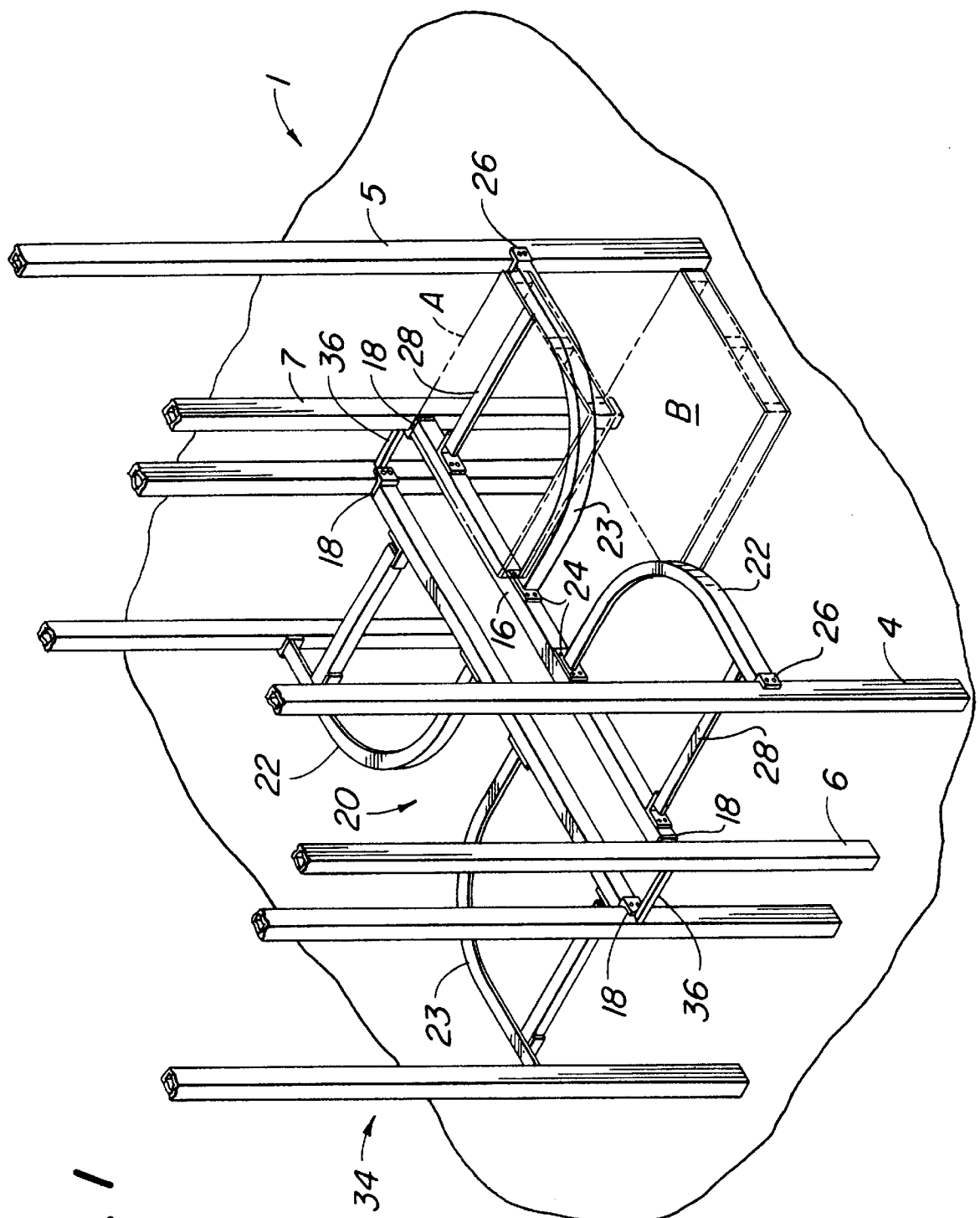
FIG. 1 is a perspective view of an ergonomic storage rack according to this invention.

The storage rack of this invention is illustrated generally as 1 in FIG. 1 where it is shown to consist essentially of a pair of front columns 4 and 5 and rear columns 6 and 7, which are joined to one another by arcuate rails 22 and 23 and an elongated support beam 16. The support beam 16 is joined to the rear columns 6 and 7 via a right angle connector plate 18 at a height suitable for receiving a pallet load as, for example, the pallet load identified as C in FIG. 2 while, at the same time, allowing room enough beneath arcuate rail 22 to accommodate a second pallet load D. The support beam 16 is be of such length as to accommodate simultaneously, side-by-side, on rails 22 and 23, two standard size pallets while, at the same time, providing space therebetween so that a worker can enter into the bay 20 and use it to select, from either pallet, the desired pallet load or any portion thereof.

Arcuate rail 22 is joined between rear horizontal beam 16 and front column 4 by means of a connector plate 24 and a connector plate 26. In similar fashion, arcuate rail 23 is joined between beam 16 and front column 5 by connector plates 24 and 26. As seen in FIG. 1, the connector plate 24 is joined to a proximate end 25 of the arcuate rails 22 and 23 and to the-support beam 16 and their distal ends 27 are joined to columns 4 and 5 via connector plate 26. As a result, rail 22 and rail 23 extend perpendicularly from the beam in a parallel spaced apart relationship so as to form shelves upon which loaded pallets may be stored.

A horizontal brace member 28 connects between support beam 16 and arcuate rails 22 and provides additional support and ensures that columns 4 and 6 are rigidly held. In a similar manner, another horizontal brace member 28 is connected between support beam 16 and arcuate rail 23 so as to provide additional support and rigidity to columns 5 and 7. Still further support is provided by the top support rail shown as 12 in FIG. 2. This support rail is a horizontally disposed member which is joined at its opposite ends to opposing columns and it ensures that the storage rack will remain rigid and secure.

In a typical use of this invention, a pallet as, for example, pallet A of FIG. 1, is stored on one arcuate rail 23, and a second pallet B is stored beneath as, for example, on a warehouse floor. The bay 20 between the arcuate rails 22 and 23 allows a person to pick from the side of a pallet as well as from the front.

If desired, the storage rack assembly, herein described, can also be joined to another to create a pair of racks which can be used in tandem as shown in FIG. 1.

When used in tandem, a tie bar of the type shown as 36 in FIG. 1 joins the units together.

Alternatively, any number of units may be joined in similar fashion to create storage assemblies of any desired size, and they may also be arranged in various patterns to accommodate whatever space is to be served.

Figure 2:
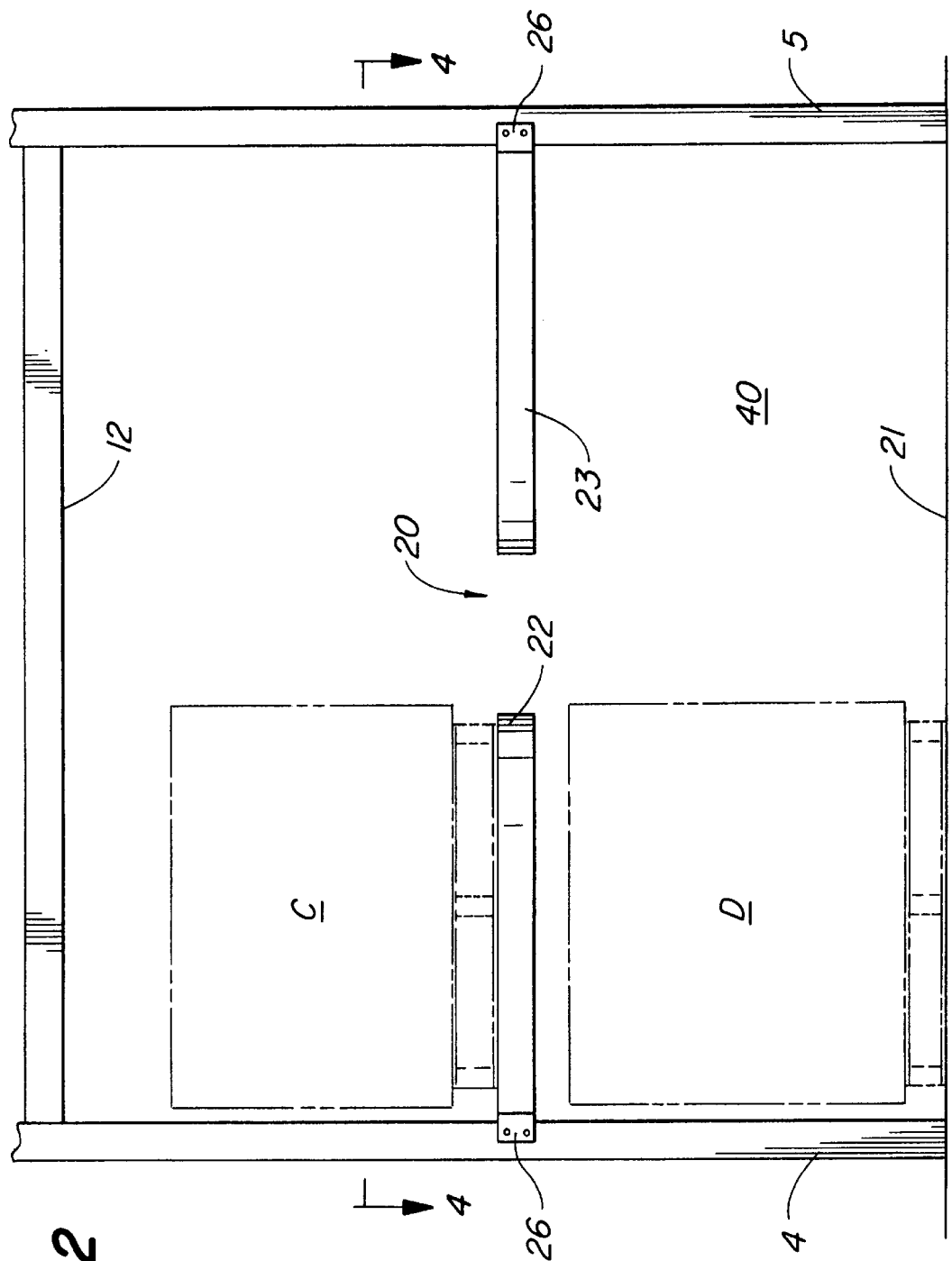
FIG. 2 is a front elevational view of the storage rack of FIG. 1 shown with pallet loads at two levels.

FIG. 2 illustrates an embodiment in which a pallet load C is supported by the shelf of arcuate rail 22 and a second pallet load D is stored in the compartment or storage space 40 beneath said shelf on a floor identified as 21. The bay 20 which serves as a picking space between the arcuate rails 22 and 23 allows access to the pallet load C in a manner which would not be possible from the side if the arcuate rails 22 and 23 were not present. Typically, the arcuate rails are employed only on ground or mezzanine levels up to shoulder height so that a worker may access the pallet loads without a ladder or picker.

Figure 3:
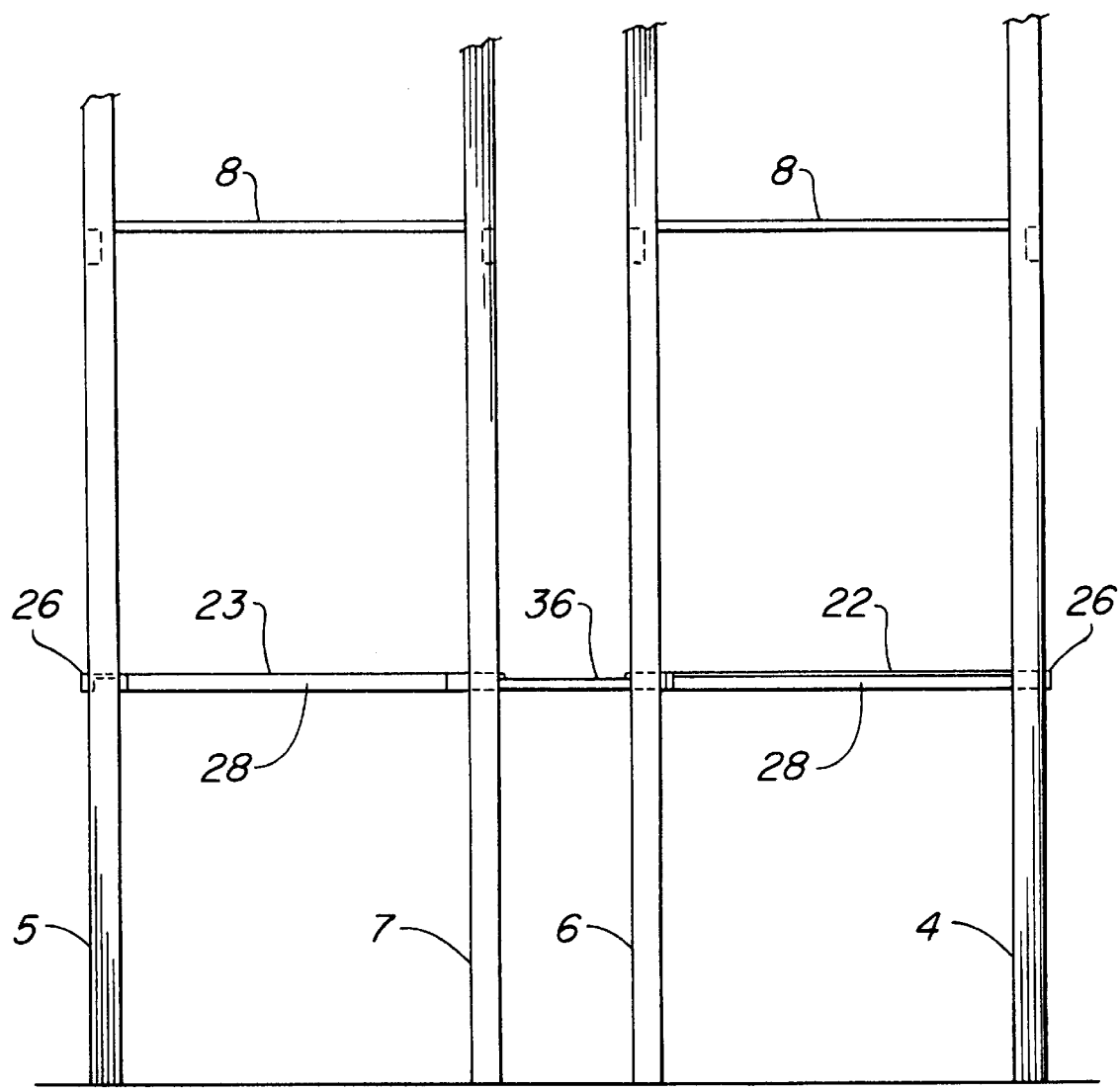
FIG. 3 is a side elevational view of the ergonomic storage rack of FIG. 1.

FIG. 3 is a side view of the back-to-back ergonomic racks of FIG. 1. Rear columns 6 and 7 are shown connected by tie bar 36 at each end of a storage rack and vertically at various levels. Brace members 28 are joined to columns 4, 5, 6, and 7 at a level which is essentially identical to that of arcuate rails 22 and 23. Side support rails 8 connect front columns 4 and 5 to rear columns 6 and 7, respectively, at a height which is impractical for employing arcuate rails 22 and 23, unless the user is raised to the necessary height by means of a ladder or picker. Arcuate rails 22 and 23 are typically used at mezzanine levels from mezzanine floor level to shoulder height, though they can be used at any height at which a person can pick from between loaded pallets.

FIG. 4 shows back-to-back ergonomic storage racks 1 and 34 with pallet load C and pallet E resting on shelves defined by arcuate rails 22 and 23 and beam 16. Also, in FIG. 4, there is shown, in phantom, a third ergonomic storage rack 38, located adjacent to the ergonomic rack 1. The space between rack 1 and rack 38 may be used for picking from both racks and is wide enough to provide access for a fork lift for restocking.

While the preferred embodiments have been fully described and depicted for the purposes of explaining the principles of the present invention, it will be appreciated by those skilled in the art that modifications and changes may be made thereto without departing from the spirit and scope of the invention set forth in the appended claims.

What is claimed is:

1. An ergonomically structured storage rack for storing pallet loads which comprises:

1) two pairs of parallel vertically disposed columns, each pair consisting of one rear column and one front column;

2) a horizontal beam extending between the rear columns of the two pairs of columns and interconnecting said rear columns so as to maintain them a predetermined distance apart; and 3) two opposing spaced apart arcuate rails, each having a proximate end and a distal end, said proximate ends being joined to said horizontal beam and said distal ends of each rail being joined to a separate one of the front columns of said two pairs of columns, said arcuate rails disposed relative to one another so as to curve toward each other from front to back and form a bay which may be entered to access said pallet loads.

2. The storage rack of claim 1 wherein said horizontal beam includes connector plates for mating connection with said rear columns such that said vertically disposed column pairs will be secure in their fixed spaced apart relationship.

3. The storage rack of claim 1 wherein said horizontal beam is connected to said rear columns and to said rails at a height sufficient to provide compartment means for pulley load storage beneath their respective arcuate rails.

4. The storage rack of claim 1 wherein said rails are connected to said horizontal beam and to said front columns by connector plates.

5. The storage rack of claim 4 wherein each of said rails includes a horizontal brace which extends in a plane from a location near its distal end to said horizontal beam, and said brace is connected to said rails and said beam by connector plates to achieve a mating engagement therewith.

6. An ergonomic storage system in which there are joined together two or more storage racks, each storage rack comprised of:

1) two pairs of parallel vertically disposed columns, each pair consisting of one rear column and one front column;

2) a horizontal beam extending between the rear columns of the two pairs of columns and interconnecting said rear columns so as to maintain them a predetermined distance apart; and 3) two opposing spaced apart arcuate rails, each having a proximate end and a distal end, said proximate ends being joined to said horizontal beam and said distal ends of each rail being joined to a separate one of the front columns of said two pairs of columns, said arcuate rails disposed relative to one another so as to curve toward each other from front to back and form a bay which may be entered to access said pallet loads.

7. The storage system of claim 6 wherein said racks are joined together back-to-back by horizontally disposed tie bars which join the rear columns of one storage rack to the rear columns of another to ensure a fixed arrangement.

* * * * *